US010893387B2

(12) United States Patent
Harris et al.

(10) Patent No.: US 10,893,387 B2
(45) Date of Patent: Jan. 12, 2021

(54) LOCATION-BASED CONTENT DELIVERY TO VEHICLES

(71) Applicant: Accenture Global Solutions Limited, Dublin (IE)

(72) Inventors: Ian Harris, Deor (IE); Salma Abdulaziz, Dublin (IE)

(73) Assignee: Accenture Global Solutions Limited, Dublin (IE)

( * ) Notice: Subject to any disclaimer, the term of this patent is extended or adjusted under 35 U.S.C. 154(b) by 0 days.

(21) Appl. No.: 16/537,667

(22) Filed: Aug. 12, 2019

(65) Prior Publication Data

US 2020/0053513 A1 Feb. 13, 2020

Related U.S. Application Data

(60) Provisional application No. 62/718,193, filed on Aug. 13, 2018.

(51) Int. Cl.
*H04W 4/029* (2018.01)
*G08G 1/01* (2006.01)
(Continued)

(52) U.S. Cl.
CPC .......... *H04W 4/029* (2018.02); *G08G 1/0141* (2013.01); *H04B 10/1129* (2013.01); *H04W 4/025* (2013.01); *H04W 4/44* (2018.02)

(58) Field of Classification Search
CPC .......... G08G 1/0141; G08G 1/096725; G08G 1/096775; G08G 1/0133; G08G 1/0116;
(Continued)

(56) References Cited

U.S. PATENT DOCUMENTS 10,216,194 B1 * 2/2019 Hayward ............... B60W 40/10
2009/0265633 A1 * 10/2009 Lim ........................ H04W 4/48
715/733

(Continued)

FOREIGN PATENT DOCUMENTS

KR 100913840 8/2009
KR 20160063518 6/2019

OTHER PUBLICATIONS

"Vehicle to Vehicle Communication System Using Li-Fi Technology" by Mali et al., dated Jun. 2017 (Year: 2017).*
(Continued)

*Primary Examiner* — Daniel Lai
(74) *Attorney, Agent, or Firm* — Fish & Richardson P.C.

(57) ABSTRACT

Methods, systems, apparatus, including computer programs encoded on computer storage medium, for location-based content delivery to vehicles using LiFi is disclosed. In one aspect, a method is disclosed that includes operations of obtaining, by a LiFi transceiver unit, a vehicle identifier that identifies a vehicle, providing, by the LiFi transceiver unit and to a server, the vehicle identifier using an internet protocol network, wherein the server is configured to determine a location of the vehicle based on the vehicle identifier and an identity of the LiFi transceiver unit that provided the vehicle identifier, receiving, by the LiFi transceiver unit and from the server, the location of the vehicle and location-based content, encoding, by the LiFi transceiver unit, the location-based content into multiple light signals, and providing, by the LiFi transceiver unit, the encoded location-based content to the vehicle using the location of the vehicle.

12 Claims, 2 Drawing Sheets

(51) Int. Cl.
  *H04W 4/44* (2018.01)
  *H04B 10/112* (2013.01)
  *H04W 4/02* (2018.01)
(58) Field of Classification Search
  CPC ........... G08G 1/0145; G08G 1/096741; G08G
    1/205; G08G 1/012; G08G 1/20; G08G
    1/017; G08G 1/096716; G08G 1/096805;
    G08G 1/202; G08G 1/00; G08G 1/0125;
    G08G 1/015; G08G 1/09; G08G 1/095;
    G08G 1/16; G08G 1/096766; G08G
    1/096811; G08G 1/142; G08G 1/146;
    G08G 1/07; G08G 1/091; G08G
    1/096783; G08G 1/141; G08G 1/164;
    H04W 4/44; H04W 4/40; H04W 4/021;
    H04W 4/023; H04W 4/029; H04W 4/46;
    H04W 4/80; H04W 4/02; H04W 4/70;
    H04W 4/024; H04W 4/025; H04W 4/35;
    H04W 4/38; H04W 4/48; G06Q 50/30;
    G06Q 10/0833; G06Q 30/0265; G06Q
    10/08355; G06F 16/29; H04B 10/1129;
    H04B 10/116; H04B 10/1149
  See application file for complete search history.

(56) References Cited

U.S. PATENT DOCUMENTS

2016/0305794 A1* 10/2016 Horita ................ G01C 21/3602
2017/0353350 A1   12/2017 Gussen et al.
2018/0339730 A1* 11/2018 Hovis ................ G06K 9/00771
2019/0261239 A1*  8/2019 Wang ................ H04B 10/1143

OTHER PUBLICATIONS

Study, realization and optimization of a visible light communication system: Application to the automotive industry by Alin-Mihai Cailean, dated Dec. 2014 (Year: 2014).*
EP Search Report in European Application No. EP 19188543, dated Dec. 5, 2019, 7 pages.
Masini et al., "Vehicular visible light networks with full duplex communication", 5th IEEE International Conference on Models and Technologies for Intelligent Transportation Systems, Jun. 2017, pp. 98-103.

* cited by examiner

200

```
┌─────────────────────────────────────────────────────────────┐
│ OBTAIN, BY A LIFI TRANSCEIVER UNIT, A                       │
│ VEHICLE IDENTIFIER THAT IDENTIFIES A VEHICLE           210  │
└─────────────────────────────────────────────────────────────┘
                              │
                              ▼
┌─────────────────────────────────────────────────────────────┐
│ PROVIDE, BY THE LIFI TRANSCEIVER UNIT AND TO A SERVER, THE  │
│ VEHICLE IDENTIFIER USING AN INTERNET PROTOCOL NETWORK  220  │
└─────────────────────────────────────────────────────────────┘
                              │
                              ▼
┌─────────────────────────────────────────────────────────────┐
│ RECEIVE, BY THE LIFI TRANSCEIVER UNIT AND FROM THE SERVER,  │
│ THE LOCATION OF THE VEHICLE AND LOCATION-BASED CONTENT      │
│                                                        230  │
└─────────────────────────────────────────────────────────────┘
                              │
                              ▼
┌─────────────────────────────────────────────────────────────┐
│ ENCODE, BY THE LIFI TRANSCEIVER UNIT, THE                   │
│ LOCATION-BASED CONTENT INTO MULTIPLE LIGHT SIGNALS     240  │
└─────────────────────────────────────────────────────────────┘
                              │
                              ▼
┌─────────────────────────────────────────────────────────────┐
│ PROVIDE, BY THE LIFI TRANSCEIVER UNIT, THE ENCODED          │
│ LOCATION-BASED CONTENT TO THE VEHICLE USING THE LOCATION    │
│ OF THE VEHICLE                                         250  │
└─────────────────────────────────────────────────────────────┘
```

*FIG. 2*

LOCATION-BASED CONTENT DELIVERY TO VEHICLES

CROSS-REFERENCE TO RELATED APPLICATIONS

This application claims the benefit of U.S. Prov. App. Ser. No. 62/718,193 filed on Aug. 13, 2018, which is expressly incorporated herein by reference in its entirety.

BACKGROUND

Digital content can be transmitted between devices. An ever increasing number of devices that can send/receive digital content is adversely impacting bandwidths of networks used to transmit the digital content. That is, as the number of communicating devices increases, a bandwidth of a network used to transmit digital content is increasingly consumed.

SUMMARY

Implementations of the present disclosure are directed to location-based content delivery to vehicles. More particularly, implementations of the present disclosure are directed to using light fidelity (LiFi) wireless communication for location-based content delivery to vehicles.

In some implementations, actions include obtaining, by a LiFi transceiver unit, a vehicle identifier that identifies a vehicle, providing, by the LiFi transceiver unit and to a server, the vehicle identifier using an internet protocol network, wherein the server is configured to determine a location of the vehicle based on the vehicle identifier and an identity of the LiFi transceiver unit that provided the vehicle identifier, receiving, by the LiFi transceiver unit and from the server, the location of the vehicle and location-based content, encoding, by the LiFi transceiver unit, the location-based content into multiple light signals, and providing, by the LiFi transceiver unit, the encoded location-based content to the vehicle using the location of the vehicle. Other implementations of this aspect include corresponding systems, apparatus, and computer programs, configured to perform the actions of the methods, encoded on computer storage devices.

These and other implementations can each optionally include one or more of the following features: the LiFi transceiver unit is located in a column; and the column is stationary.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

BRIEF DESCRIPTION OF THE DRAWINGS

FIG. 2 is a flowchart of an example of a process for providing location-based content delivery to a vehicle using LiFi.

Like reference symbols in the various drawings indicate like elements.

DETAILED DESCRIPTION

Figure 1:
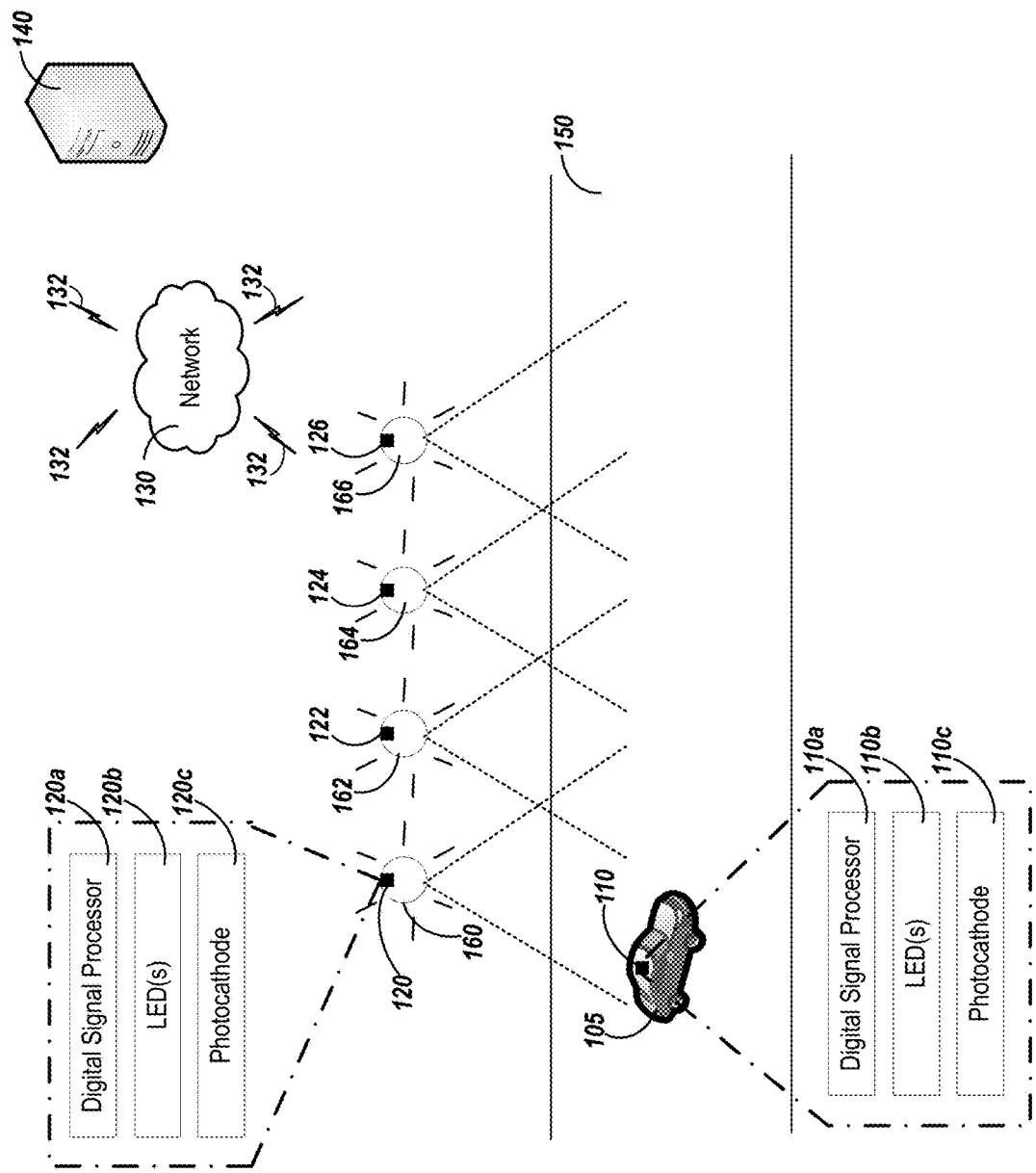
FIG. 1 is a contextual diagram of an example of a system providing location-based content delivery to a vehicle using LiFi.

Implementations of the present disclosure are directed to location-based content delivery to vehicles. More particularly, implementations of the present disclosure are directed to using light fidelity (LiFi) wireless communication for location-based content delivery to vehicles. In some implementations, actions include obtaining, by a LiFi transceiver unit, a vehicle identifier that identifies a vehicle, providing, by the LiFi transceiver unit and to a server, the vehicle identifier using an internet protocol network, wherein the server is configured to determine a location of the vehicle based on the vehicle identifier and an identity of the LiFi transceiver unit that provided the vehicle identifier, receiving, by the LiFi transceiver unit and from the server, the location of the vehicle and location-based content, encoding, by the LiFi transceiver unit, the location-based content into multiple light signals, and providing, by the LiFi transceiver unit, the encoded location-based content to the vehicle using the location of the vehicle.

As described in further detail herein, implementations of the present disclosure use LiFi wireless communication technology to deliver digital content to vehicles. LiFi uses infra-red, visible, and ultra-violet light spectrums to transmit data. More particularly, Li-Fi can use wireless transmission protocols (e.g., IEEE 802.11 protocols) for wirelessly transmitting data within a network. In the context of implementations of the present disclosure, the network can at least partially include one or more vehicles and one or more LiFi transceivers.

FIG. 1 is contextual diagram of an example of a system 100 that can be used to monitor traffic flow using LiFi. The system 100 may include a LiFi vehicle transceiver 110, one or more LiFi transceivers 120, 122, 124, 126 proximate to a road 150, a network 130, and a server 140.

The LiFi vehicle transceiver 110 is coupled to a surface of a vehicle 105. In some implementations, the LiFi vehicle transceiver 110 may be coupled to the top of the vehicle 105. However, the present disclosure need not be so limited. Instead, for example, the LiFi vehicle transceiver 110 may be coupled to the vehicle 105 in any location that is capable of detecting light output by one or more LiFi transceivers 120, 122, 124, 126 installed proximate the road 150. By way of example, in some implementations, the LiFi transceivers 120, 122, 124, 126 that are installed proximate to the road 150 may include LiFi transceivers that are coupled to a stationary column such as a lamp, a light post, road sign, or other structure located proximate the road 150. In other implementations, one or more of the LiFi transceivers 120, 122, 124, 126 may be coupled to a moving object such as a drone. The drone may include, e.g., a flying drone, a land-based drone, a water-based drone, or the like.

Each of the LiFi transceivers 110, 120, 122, 124, 126 may include a digital signal processor, one or more LEDs, and a photodiode. For example, the LiFi vehicle transceiver 110 includes a digital signal processor 110a, one or more LEDs 110b, and a photodiode 110c. Similarly, by way of another example, the LiFi transceivers 120, 122, 124, 126 installed proximate to the road 150 may each include a digital signal processor 120a, one or more LEDs 120b, and a photodiode 120c.

In some examples, the vehicle 105 can travel along the road 150 having multiple columns (e.g., lamps, light posts, other lighting units, road signs, or other structures) 160, 162, 164, 166 positioned alongside. In some examples, each column 160, 162, 164, 166 has a respective LiFi transceiver 120, 122, 124, 126. The LiFi vehicle transceiver 110 can use the digital signal processor 110a to encode a vehicle identifier into a plurality of light signals output by the LED(s) 110b. The vehicle identifier may include, for example, a MAC address of a device installed on the vehicle 105. Alternatively, or in addition, the LiFi vehicle transceiver 110 can encode one or more requests for location-based content, one or more requests for location-based services, or a combination thereof.

In some examples, a LiFi transceiver 120 within range of the vehicle 105 can detect light signals output by the LiFi transceiver 110 using the photocathode 120c. The photocathode 120c can generate an analog signal based on the detected light signals, and the generated analog signal can be provided to a digital signal processor 120a that can decode the analog signal to obtain information, such as a vehicle identifier that is provided by the LiFi transceiver 110, one or more requests for location-based content, one or more requests for location-based services, or a combination thereof.

In some examples, each LiFi transceiver 120, 122, 124, 126 may include a network interface that enables the LiFi transceiver 120, 122, 124, 126 to communicate with one or more back end servers 140 over the network 130. The network may include, for example, a WAN, a LAN, a cellular network, the Internet, or a combination thereof. The back end servers 140 may include content servers, location tracking servers, traffic management servers, or the like. For example, the LiFi transceiver 120 may be configured to access the server 140 to obtain content that can be converted into LiFi light signals, and communicated to the vehicle 105 using communication between the LiFi transceiver 120 and the LiFi vehicle transceiver 110.

Communicating with the server 140 may include the LiFi transceiver 120 providing a vehicle identifier, a request for location-based content, a request for a location-based services, a LiFi transceiver 120 identifier, or a combination thereof, to the server 140 over the network 130. In some implementations, the LiFi transceiver 120 need only provide a vehicle identifier to the server 140. Then, the server 140 can determine the identity of the LiFi transceiver that provided the vehicle identifier based on the data received from the LiFi transceiver 120, data stored locally on the server 140, or a combination thereof. Similarly, the server 140 need not receive a request for location-based content, a request for location-based services, or the like. Instead, the server 140 can provide location-based content, location-based services, or the like to the vehicle based on a receipt of a vehicle identifier and determination of the vehicle's location.

The server 140 may employ functionality that is able to track the location of the vehicle 105. For example, the server 140 can determine the location of a vehicle based on a vehicle 105 identifier such as a MAC Address and the identity of the LiFi transceiver 120 that detected, and provided to the server 140, the vehicle identifier. Using this technique, the system 100 can track a vehicle 105. In addition, the server 140 can also determine traffic patterns, such as the congestion of vehicles on the road 150 in any one particular location by aggregating a count of individual vehicles whose vehicle identifier is detected near a particular column 160, 162, 164, 166. The server 140 may then generate and recommend one or more alternative routes based on an evaluation of the congestion points along each of a plurality of respective paths.

The server 140 may also store location-based content that may be streamed to the vehicle 105 using the network 130, the one or more LiFi transceivers 120, 122, 124, 126, and the LiFi vehicle transceiver 110. The server 140 may provide location-based content to the LiFi transceiver 120 using the network 130. The LiFi transceiver 120 can encode the location-based content, using the digital signal processor 120a, into signals that can be output by the LED(s) 120b. The encoded information may include location-based content data such as data representing text data, data representing audio data, data representing video data, or the like. The generated light signals can be detected by the photodiode 110c of the LiFi vehicle transceiver 110 when the photodiode 110c is within line of site of the light signals output by a particular LiFi transceiver 120, 122, 124, 126.

The LiFi vehicle transceiver 110 can detect content data such as location-specific content data that is output by a LiFi transceiver 120 using multiple light signals generated using the one or more LEDs 120b. The photodiode 110c outputs an analog signal based on the detected LiFi light signals that are provided to the digital signal processor 110a. The digital signal processor 110a can sample the analog signal received from the one or more LEDs 120b and convert the sampled signal to a digital representation that can be processed by one or more computers onboard the vehicle 105. The digital representation of the detected content data can be rendered by the one or more computers to generate output using one or more displays or speakers within the vehicle 105. In some examples, the vehicle 105 may be equipped with a router that can wirelessly broadcast the detected content data to one or more user devices such as a smartphone, tablet, smartwatch, laptop, or the like belonging to a vehicle occupant.

Each respective LiFi transceiver 120, 122, 124, 126 may be configured to implement hand-over algorithms by dynamically communicating directly with each other over the network 130, or indirectly through a central networking node to which each respective LiFi transceiver 120, 122, 124, 126 is connected to over the network 130. In some examples, two or more of the LiFi transceivers 120, 122, 124, 126 communicate with one another to facilitate session management of content data output to the vehicle 105 as the vehicle 105 drives down the road 150. Such session management facilitates smooth streaming of content over the network of LiFi signal transceivers as the source emitting the light signals changes from LiFi transceiver to LiFi transceiver as the vehicle 105 travels down the road 150.

FIG. 2 is a flowchart of an example of a process 200 for providing location-based content delivery to a vehicle using LiFi. In general, the process 200 may include operations that include obtaining, by a LiFi transceiver unit, a vehicle identifier that identifies a vehicle (210), providing, by the LiFi transceiver unit and to a server, the vehicle identifier using an Internet protocol network, wherein the server is configured to determine a location of the vehicle based on the vehicle identifier and an identity of the LiFi transceiver unit that provided the vehicle identifier (220), receiving, by the LiFi transceiver unit and from the server, the location of the vehicle and location-based content (230), encoding, by the LiFi transceiver unit, the location-based content into multiple light signals (240), and providing, by the LiFi transceiver unit, the encoded location-based content to the vehicle using the location of the vehicle.

Implementations and all of the functional operations described in this specification may be realized in digital electronic circuitry, or in computer software, firmware, or hardware, including the structures disclosed in this specification and their structural equivalents, or in combinations of one or more of them. Implementations may be realized as one or more computer program products, i.e., one or more modules of computer program instructions encoded on a computer readable medium for execution by, or to control the operation of, data processing apparatus. The computer readable medium may be a machine-readable storage device, a machine-readable storage substrate, a memory device, a composition of matter effecting a machine-readable propagated signal, or a combination of one or more of them. The term "computing system" encompasses all apparatus, devices, and machines for processing data, including by way of example a programmable processor, a computer, or multiple processors or computers. The apparatus may include, in addition to hardware, code that creates an execution environment for the computer program in question (e.g., code) that constitutes processor firmware, a protocol stack, a database management system, an operating system, or a combination of one or more of them. A propagated signal is an artificially generated signal (e.g., a machine-generated electrical, optical, or electromagnetic signal) that is generated to encode information for transmission to suitable receiver apparatus.

A computer program (also known as a program, software, software application, script, or code) may be written in any appropriate form of programming language, including compiled or interpreted languages, and it may be deployed in any appropriate form, including as a stand alone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry (e.g., an FPGA (field programmable gate array) or an ASIC (application specific integrated circuit)).

Processors suitable for the execution of a computer program include, by way of example, both general and special purpose microprocessors, and any one or more processors of any appropriate kind of digital computer. Generally, a processor will receive instructions and data from a read only memory or a random access memory or both. Elements of a computer can include a processor for performing instructions and one or more memory devices for storing instructions and data. Generally, a computer will also include, or be operatively coupled to receive data from or transfer data to, or both, one or more mass storage devices for storing data (e.g., magnetic, magneto optical disks, or optical disks). However, a computer need not have such devices. Moreover, a computer may be embedded in another device (e.g., a mobile telephone, a personal digital assistant (PDA), a mobile audio player, a Global Positioning System (GPS) receiver). Computer readable media suitable for storing computer program instructions and data include all forms of non-volatile memory, media and memory devices, including by way of example semiconductor memory devices (e.g., EPROM, EEPROM, and flash memory devices); magnetic disks (e.g., internal hard disks or removable disks); magneto optical disks; and CD ROM and DVD-ROM disks. The processor and the memory may be supplemented by, or incorporated in, special purpose logic circuitry.

To provide for interaction with a user, implementations may be realized on a computer having a display device (e.g., a CRT (cathode ray tube), LCD (liquid crystal display), LED (light-emitting diode) monitor, for displaying information to the user and a keyboard and a pointing device (e.g., a mouse or a trackball), by which the user may provide input to the computer. Other kinds of devices may be used to provide for interaction with a user as well; for example, feedback provided to the user may be any appropriate form of sensory feedback (e.g., visual feedback, auditory feedback, or tactile feedback); and input from the user may be received in any appropriate form, including acoustic, speech, or tactile input.

Implementations may be realized in a computing system that includes a back end component (e.g., as a data server), or that includes a middleware component (e.g., an application server), or that includes a front end component (e.g., a client computer having a graphical user interface or a Web browser through which a user may interact with an implementation), or any appropriate combination of one or more such back end, middleware, or front end components. The components of the system may be interconnected by any appropriate form or medium of digital data communication (e.g., a communication network). Examples of communication networks include a local area network ("LAN") and a wide area network ("WAN") (e.g., the Internet).

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the to be filed claims.

What is claimed is:

1. A system, comprising:
one or more computers and one or more storage devices storing instructions that, when executed by one or more computers, to cause the one or more computers to perform operations comprising:
obtaining, by a LiFi transceiver unit of a plurality of LiFi transceiver units, a vehicle identifier that identifies a vehicle;
providing, by the LiFi transceiver unit and to a server, the vehicle identifier using an internet protocol network, wherein the server is configured to determine a location of the vehicle based on the vehicle identifier and an identity of the LiFi transceiver unit that provided the vehicle identifier;
receiving, by each LiFi transceiver unit of the plurality of LiFi transceiver units and from the server, the location of the vehicle and first location-based content comprising one or more alternative routes for the vehicle;
encoding, by each LiFi transceiver unit of the plurality of LiFi transceiver units, the first location-based content into multiple light signals as encoded first location-based content; and
providing, by the plurality of LiFi transceiver units, the encoded first location-based content to the vehicle using the location of the vehicle, wherein hand-over algorithms are used to stream the first encoded location-based content to the vehicle from the plurality of LiFi transceiver units such that a source LiFi transceiver unit of the plurality of LiFi transceiver units that is emitting light signals to the vehicle including the encoded first location-based content changes as the vehicle travels down a road.

2. The system of claim 1, wherein each LiFi transceiver unit is located in a column of a plurality of columns.

3. The system of claim 2, wherein the column is stationary.

4. The system of claim 1, wherein operations further comprise:
receiving, by the LiFi transceiver unit and from the server, second location-based content;
encoding, by the LiFi transceiver unit, the second location-based content into multiple light signals; and
providing, by the LiFi transceiver unit, the encoded second location-based content to the vehicle, the encoded second location-based content being decoded and distributed within the vehicle to provide the second location-based content to at least one user device.

5. A method, comprising:
obtaining, by a LiFi transceiver unit of a plurality of LiFi transceiver units, a vehicle identifier that identifies a vehicle;
providing, by the LiFi transceiver unit and to a server, the vehicle identifier using an internet protocol network, wherein the server is configured to determine a location of the vehicle based on the vehicle identifier and an identity of the LiFi transceiver unit that provided the vehicle identifier;
receiving, by each LiFi transceiver unit of the plurality of LiFi transceiver units and from the server, the location of the vehicle and first location-based content comprising one or more alternative routes for the vehicle;
encoding, by each LiFi transceiver unit of the plurality of LiFi transceiver units, the first location-based content into multiple light signals as encoded first location-based content; and
providing, by the plurality of LiFi transceiver units, the encoded first location-based content to the vehicle using the location of the vehicle, wherein hand-over algorithms are used to stream the first encoded location-based content to the vehicle from the plurality of LiFi transceiver units such that a source LiFi transceiver unit of the plurality of LiFi transceiver units that is emitting light signals to the vehicle including the encoded first location-based content changes as the vehicle travels down a road.

6. The method of claim 5, wherein each LiFi transceiver unit is located in a column of a plurality of columns.

7. The method of claim 6, wherein the column is stationary.

8. The method of claim 5, further comprising:
receiving, by the LiFi transceiver unit and from the server, second location-based content;
encoding, by the LiFi transceiver unit, the second location-based content into multiple light signals; and
providing, by the LiFi transceiver unit, the encoded second location-based content to the vehicle, the encoded second location-based content being decoded and distributed within the vehicle to provide the second location-based content to at least one user device.

9. A non-transitory computer-readable medium storing software comprising instructions executable by one or more computers which, upon such execution, cause the one or more computers to perform operations comprising:
obtaining, by a LiFi transceiver unit of a plurality of LiFi transceiver units, a vehicle identifier that identifies a vehicle;
providing, by the LiFi transceiver unit and to a server, the vehicle identifier using an internet protocol network, wherein the server is configured to determine a location of the vehicle based on the vehicle identifier and an identity of the LiFi transceiver unit that provided the vehicle identifier;
receiving, by each LiFi transceiver unit of the plurality of LiFi transceiver units and from the server, the location of the vehicle and first location-based content comprising one or more alternative routes for the vehicle;

encoding, by each LiFi transceiver unit of the plurality of LiFi transceiver units, the first location-based content into multiple light signals as encoded first location-based content; and providing, by the plurality of LiFi transceiver units, the encoded first location-based content to the vehicle using the location of the vehicle, wherein hand-over algorithms are used to stream the first encoded location-based content to the vehicle from the plurality of LiFi transceiver units such that a source LiFi transceiver unit of the plurality of LiFi transceiver units that is emitting light signals to the vehicle including the first location-based content changes as the vehicle travels down a road.

10. The computer-readable medium of claim 9, wherein each LiFi transceiver unit is located in a column of a plurality of columns.

11. The computer-readable medium of claim 10, wherein the column is stationary.

12. The computer-readable medium of claim 9, wherein operations further comprise:

receiving, by the LiFi transceiver unit and from the server, second location-based content;

encoding, by the LiFi transceiver unit, the second location-based content into multiple light signals; and providing, by the LiFi transceiver unit, the encoded second location-based content to the vehicle, the encoded second location-based content being decoded and distributed within the vehicle to provide the second location-based content to at least one user device.

* * * * *